United States Patent Office 3,441,710
Patented Apr. 29, 1969

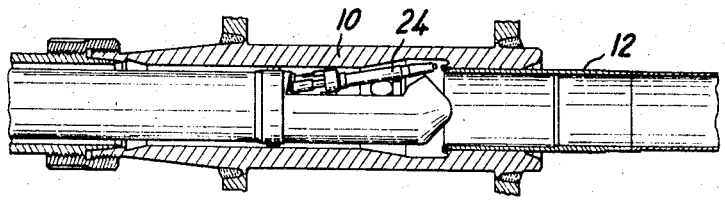
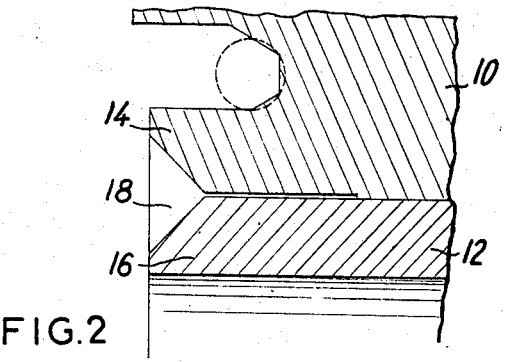
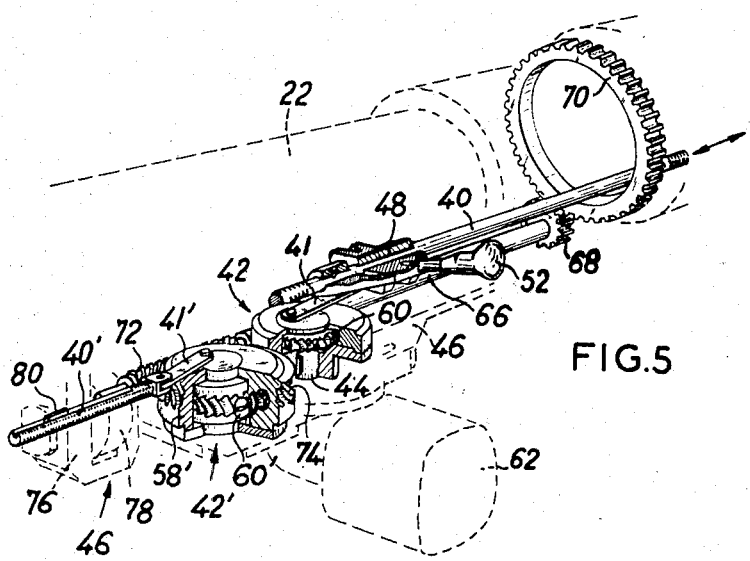

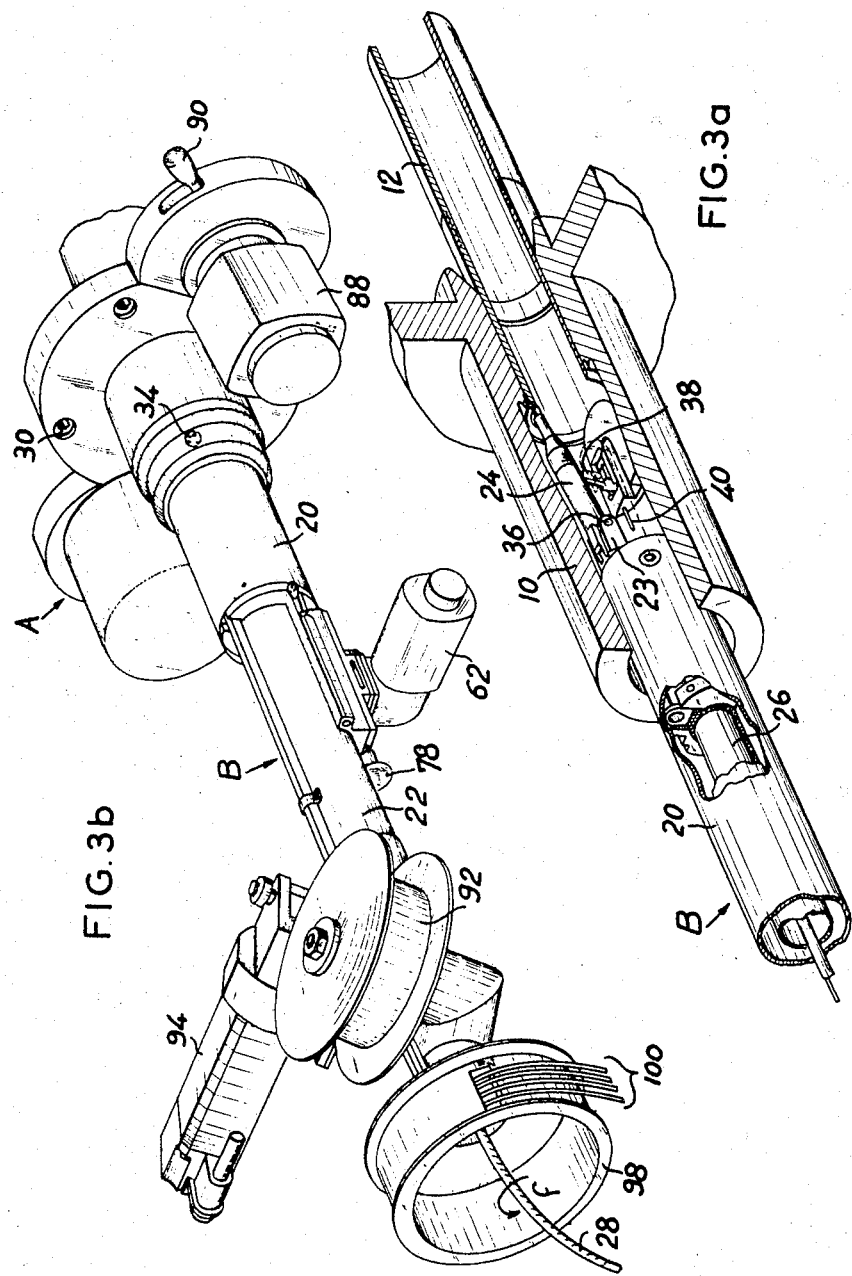

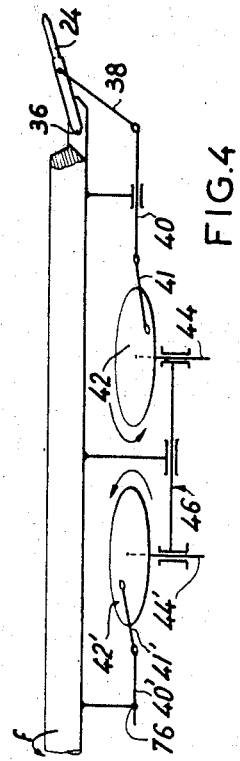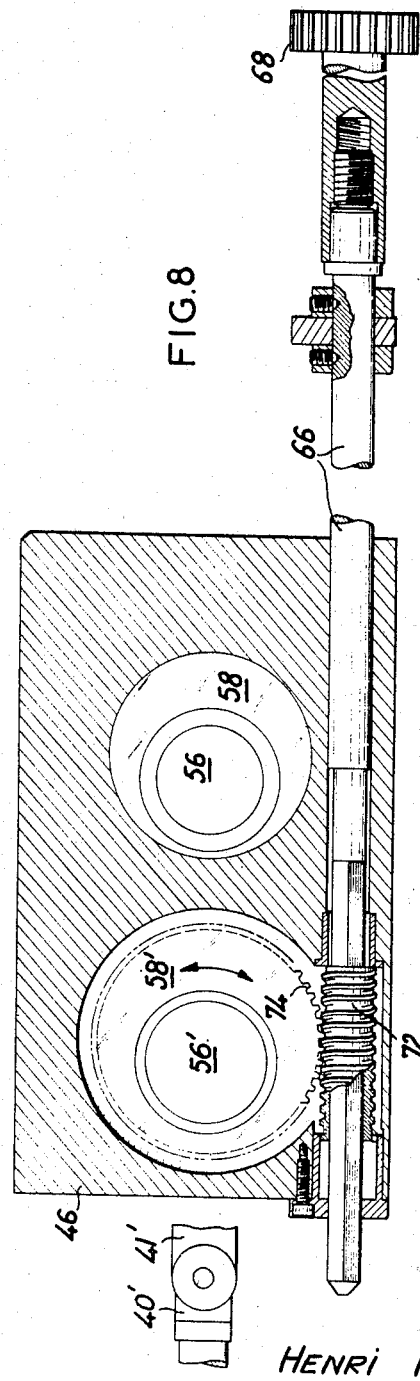

3,441,710
WELDING PROCESS AND APPARATUS
Henri Foulquier, Thibault-Rueil-Malmaison, and Jean-Pierre Peyrot, Paris, France, assignors to Commissariat à l'Energy Atomique, Paris, France
Filed Mar. 2, 1965, Ser. No. 436,444
Claims priority, application France, Mar. 5, 1964, 966,289
Int. Cl. B23k 9/12, 31/06
U.S. Cl. 219—125     7 Claims

ABSTRACT OF THE DISCLOSURE

Welding is performed by mounting the welding unit on the axis of a circular, non-horizontal zone to be welded and rotating the welding unit about said axis. The welding tip is slowly oscillated radially during rotation to subscribe a mean circle, the axis of which is displaced upwardly off-center with respect to the axis of the circular zone and that of the welding unit. Also during rotation, the welding tip is rapidly oscillated radially in a welding motion back and forth across the circular zone.

---

This invention relates to welding processes and is specifically directed to a process for performing welds along a circular zone having an axis which is inclined to the vertical and an apparatus for the practical application of said process or a like process.

One important although not exclusive application of the invention concerns the jointing of two tubular members by arc-welding process, which consists in making a weld with or without addition of filler metal between two concentric flanges of said tubular members. The forming of good quality welds along a circular path gives rise to serious difficulties, in particular when provision is made for an addition of metal within an annular recess which is limited by two concentric lips and when such a circular path is not horizontal.

The machine in accordance with the invention is especially intended to effect by internal welding the leak-tight assembly of pipe-sections of which the extremities to be joined together are inaccessible from the exterior, especially for reasons of space requirements or radio-activity. Welds of this type can evidently be contemplated only in semi-automatic operation or automatic operation, manual processes being excluded.

Among the operations which entail difficulties of this nature, there can be mentioned by way of example the welding of horizontal pressure tubes to the end walls of a reactor pressure vessel. Up to the present time, the welding operation has been performed in two half-downward movements by causing the welding torch to rotate from the top position about a horizontal axis; the action of gravity made it difficult to ensure effective deposition of metal without producing a defect in the filler metal and without producing an overthickness at the top and bottom of the weld bead as a result of the displacement of the pool of molten metal under the action of the gravitational field.

The invention has for its object the design of a process whereby results of at least the same quality as those achieved by manual welding are obtained by associating with the rotary motion of the torch a series of movements which are conductive to a satisfactory deposition of metal and improved uniformity of the weld structure.

To this end, the displacement of the welding unit in accordance with the process which is proposed by the present invention consists in a movement of rotation in a mean circle, the axis of which is upwardly displaced off-center with respect to the axis of the weld to be performed, and a movement of radial oscillation.

For the purpose of forming a welding joint with the addition of a filler metal between two tubular members provided at the point of contact with chamfered lips forming an annular recess, the displacement of the welding torch consists in a movement of rotation of the torch which is such that this latter performs a weld in a mean circle having a radius which is substantially equal to the mean radius of said recess and the axis of which is upwardly displaced off-center with respect to the center of said recess and a radial oscillation of the welding torch with a sufficient amplitude to ensure that this latter forms a weld on both lips of the chamfer.

The invention also has for its object a welding apparatus for the practical application of the process according to the invention or a like process. The apparatus in accordance with the invention comprises a support member, means for centering said support member in the axis of a circular zone to be welded, means for causing said support member to rotate about said axis, a welding unit pivotally mounted on a pin located transversely with respect to the aforesaid axis and carried by the support member, and a mechanism for producing the displacement and radial adjustment of the welding member which imparts to said welding unit a cyclic variation of its radius of action through one complete revolution of the support member and/or a rapid variation of said radius of action at a frequency which is considerably higher than the preceding.

The invention further consists in other arrangements which are preferably employed in conjunction with the preceding but which can also be employed independently thereof. All of these arrangements as well as others will become more readily apparent from a perusal of the following description of one form of embodiment which is given solely by way of non-limitative example.

In the accompanying drawings:

FIG. 1 is a diagrammatic sectional view of two tubular members to be joined together by internal welding and of the terminal portion of an apparatus in accordance with the invention in the position which is occupies during the welding operation;

FIG. 2 is a diagrammatic view in cross-section taken in a plane which passes through the axis, showing the zones to be welded of the two tubular elements of FIG. 1;

FIGS. 3a and 3b are views in perspective showing respectively the terminal portion of the apparatus which has already been illustrated in FIG. 1 and the other terminal portion which projects from the tubular members to be welded;

FIG. 4 shows the principle of the kinematic chain for controlling the movements of the welding torch;

FIG. 5 is a view in perspective of the mechanisms which constitute the kinematic chain of FIG. 4, those portions of the apparatus which are associated with said mechanisms being shown diagrammatically in broken lines;

FIGS. 7 and 8 are sectional views taken along the lines VII—VII and VIII—VIII of FIG. 6.

Figure 6:
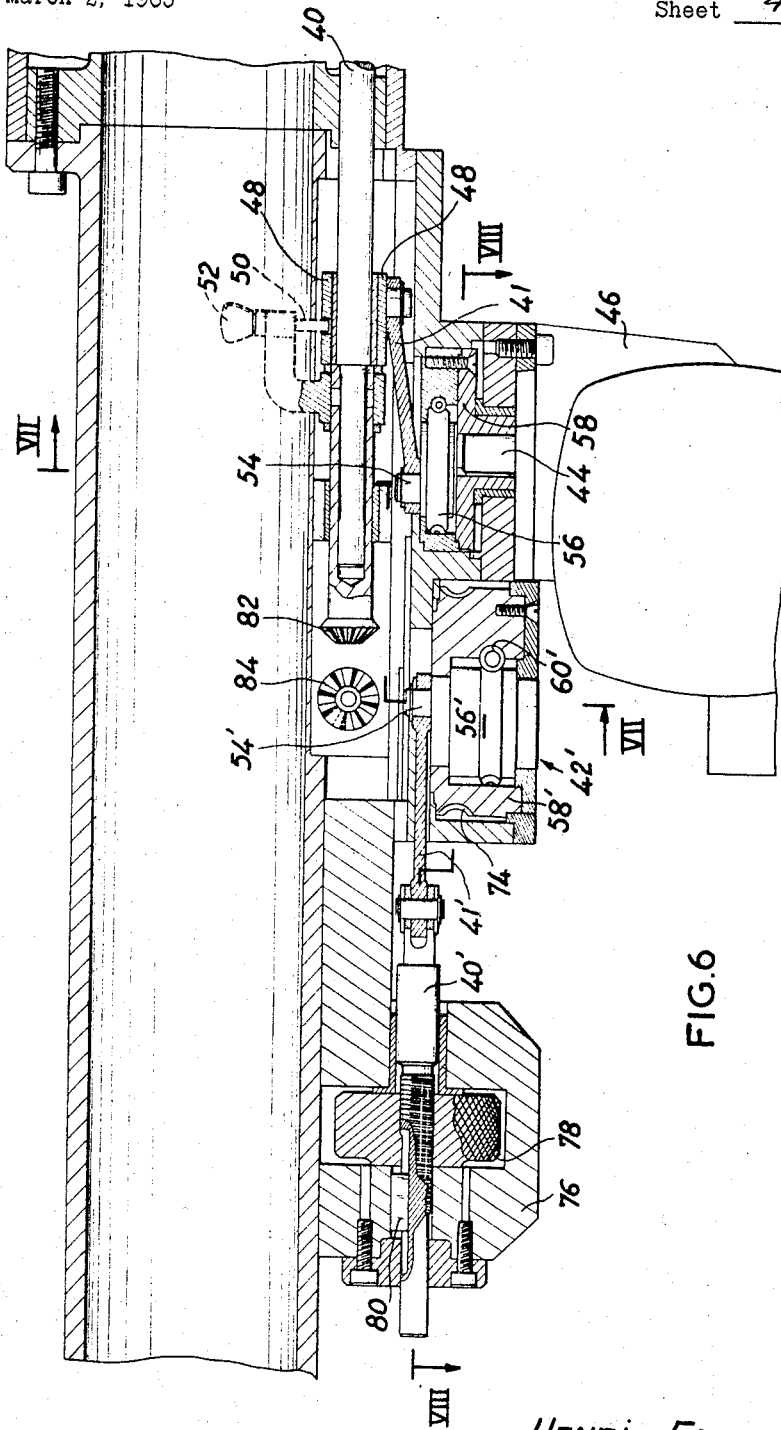
FIG. 6 is a longitudinal sectional view of that portion of the apparatus which contains the mechanisms of FIGS. 4 and 5.

The welding apparatus as illustrated is intended to join a sleeve 10 to a tube 12 (as shown in FIGS. 1, 2 and 3) by welding with addition of a filler metal along a circular zone having a horizontal axis. The portions to be welded of said sleeve and said tube are constituted by two lips 14 and 16 of comparable thickness which are chamfered so as to form an annular recess 18 (as shown in FIG. 2).

The welding apparatus comprises a stationary assembly A consisting of a casing which carries the operating mechanisms and a moving assembly B consisting of two concentric tubes 20 and 22 which can be inserted as a single unit within the sleeve 10; the outer tube 20 which is both slidably and rotatably mounted within the casing is provided with centering members which will be described hereinafter and which are designed to maintain the entire apparatus in the axis of the sleeve. The inner tube 22 terminates in a head 23 on which the welding torch 25 is pivotally mounted.

The members for controlling the torch 24 are disposed between the two tubes and on the outer tube so as to free the interior of the inner tube which is thus adapted to accommodate an optical viewing system terminating in a television camera 26 which is coupled to a receiver (not shown) by means of a cable 28 (FIG. 3).

The stationary assembly is fitted with fixing members such as screws 30 (as shown in FIG. 3b) which serve to secure the casing to the sleeve 10.

The moving assembly B which comprises the tubes 20 and 22 is rotatably mounted within a bore of the casing about an axis which coincides with that of the sleeve 10; said moving assembly is also capable of sliding longitudinally under the action of a rack and pinion mechanism which has not been illustrated for the purpose of moving the welding torch into a suitable longitudinal position relative to the lips 14 and 16. A locking member which is represented diagrammatically by a screw 34 (as shown in FIG. 3b) serves to secure the outer tube against longitudinal translational motion once the welding torch is in position.

The radial adjustment of the welding torch is carried out by means of a pivotal movement of this latter about a pin 36 which is located transversely with respect to the axis of rotation of the assembly B; the angle of slope of the welding torch 24 is determined by the position of a control link-arm 38 (shown in FIG. 3a), one extremity of which is pivotally coupled to the welding torch and the other extremity of which is pivotally coupled to a control rod 40, said rod being adapted to carry out a movement of translation parallel to the axis of rotation.

In order to impart to the nose of the welding torch a movement which results from the superimposition of a pseudo-movement of rotation which is eccentric with respect to the axis of the sleeve on a movement of radial oscillation, a number of solutions are possible. The solution which has been chosen in the form of embodiment described consists in imparting to the assembly B which carries the welding torch 24 a movement of rotation about an axis which coincides with that of the sleeve and in modifying the angle of slope of the welding torch 24 during said movement of rotation by producing action on the control rod 40.

The action produced on the control rod must be twofold; in the first place, it must modify the radius of action of the welding torch in a cyclic manner once per full revolution of the moving assembly B in order to produce the displacement off-center. In the second place, it must superimpose on the cyclic movement a movement of higher frequency which corresponds to the radial oscillation of the welding torch.

The kinematic chain which serves to produce these two movements of the welding torch is represented in a very diagrammatic manner in FIG. 4 and is shown more fully in FIGS. 5 to 8; the said kinematic chain comprises a series of serially arranged mechanisms which couple the control rod to a fixed point which is integral with the assembly B. The principle of operation of these different mechanisms will be briefly defined in reference to FIG. 4, and will then be described in greater detail.

During normal operation, the control rod 40 is coupled to a connecting-arm 41 driven by an eccentric 42 which is adapted to rotate on a pivot-pin 44 carried by a plate 46 which is slidably mounted on the assembly B. The eccentric is driven in rotation by a motor 62 carried by the plate at a speed such that the period of oscillation of the welding torch is substantially shorter than the period T of rotation of the assembly B.

The plate itself is coupled to a fixed point 76 which is made integral with the assembly B and the means employed for coupling said plate to said fixed point consist of a rod 40' and a connecting-rod 41' which drives an eccentric 42', said eccentric being rotatably mounted on a pivot-pin 44' which is also carried by the plate. The movement of rotation of the assembly B and of the eccentric 44' are synchronized so that the period of rotation of the eccentric 44' is equal to the period T.

The mechanisms which have just been described are shown more completely in FIGS. 5 to 8.

During normal operation, the control rod 40 is coupled to a bushing 48 by means of a releasable locking-bolt 50 which is operated by means of a thumb-screw head 52. Said locking-bolt is shown in FIGS. 5 and 7 and is represented diagrammatically in broken lines in FIG. 6 in an orientation which is different from its real orientation.

The bushing 48 is driven by the connecting-arm 41 which is pivotally mounted on the eccentric 42 by means of a pin 54. Said eccentric comprises an inner disc 56 to which is fixed the pin 54 (located off-center with respect to the center of the disc) and an outer disc 58 which is adapted to rotate on the pin 44 carried by the plate. The inner disc 56 is disposed within a circular housing of the outer disc, said housing being located off-center with respect to the pin 44. The orientation of the inner disc within the outer disc can be modified by means of a set-screw 60 which makes it possible to adjust the radius of the circular path followed by the pin 54 during the rotation of the eccentric.

During operation, the assembly consisting of both discs 56 and 58 is driven in rotation by a motor 62 carried by the plate. The speed of rotation must be such that the oscillation of the welding torch takes place at a sufficiently high frequency which is very distinctly higher than that of the movement of rotation of the assembly B. The transmission of movement between the motor 62 and the outer disc 58 of the eccentric takes place by means of a conventional bevel-gear drive system and if necessary through the intermediary of a reduction gear train.

Figure 7:
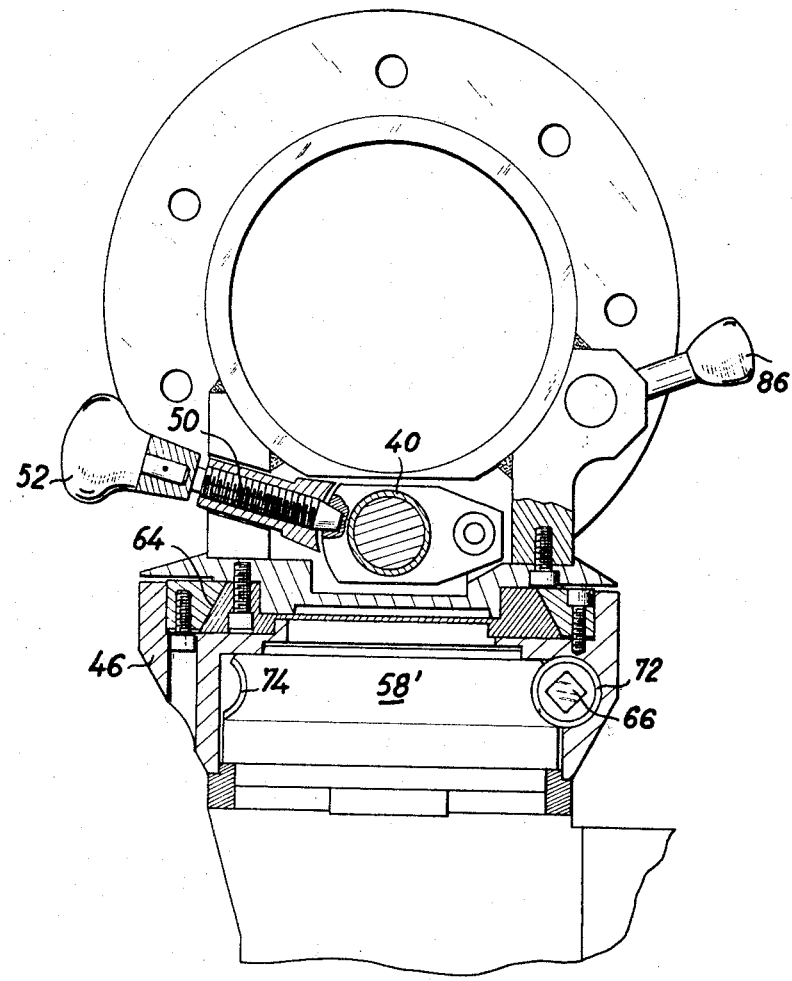

The plate 46 is adapted to slide in guides 64 (as shown in FIG. 7) which are arranged for this purpose on the inner tube 22. Said plate is coupled to the fixed point 76 by means of the second eccentric mechanism which is intended to impart a translational movement thereto at a frequency which is equal to the frequency of rotation of the assembly B. Said second mechanism, which is similar to the first, comprises the connecting-arm 41' which is pivotally coupled to the rod 40' and to the central disc 56' of an eccentric, the outer disc 58' of which is driven in rotation in synchronism with the assembly B. The adjustment of eccentric displacement is effected by means of a screw system 60' which is comparable with that which is fitted on the first eccentric.

The outer disc 58' is driven in rotation, not by a separate motor, but by a synchronization shaft 66 which is secured against translational motion relative to the casing and the front extremity of which is fitted with a pinion 68 which is adapted to engage with a ring-gear 70 (as shown in FIG. 5) which is fixed to the inside of the casing. The rear portion of the shaft is either splined or has a square section, there being slidably mounted on said rear portion a worm-screw 72 which is adapted to engage with a set of teeth 74 formed on the periphery of the outer disc.

The sliding assembly of the worm-screw 72 permits this latter not only to remain engaged at the time of longitudinal adjustment of the moving assembly B, but also to follow the eccentric during the reciprocating movement of translation of the plate 46.

The out-of-step relation between the movements of rotation of the eccentric 42' and the assembly B is usually adjusted so that the minimum radius of sweep of the welding torch corresponds to the lowest position reached by this latter.

The fixed point is constituted by a yoke 76 which is made integral with the inner tube 22 and imprisons in translational motion a knurled nut 78 in which the rod 40' is screwed, said rod being secured against rotation relative to the yoke 76 by means of a sliding key 80 (as shown in FIG. 6). Thus, the manual rotation of the knurled nut 78 makes it possible to modify the position of the plate and therefore to displace the control rod 40 so as to adjust the angular position of the welding torch.

The use of an adjustable fixed point is intended to permit the fine adjustment of the radius of action of the welding torch, if necessary during operation. Prior to starting up of the apparatus, the angle of inclination of the welding torch is coarsely adjusted by means of a device which has not been shown in the drawings and fitted on the connecting-arm 38, the adjustment being completed by means of the knurled nut 78.

The welding apparatus is designed to be inserted within the sleeve 10 together with the welding torch 24 in the retracted position. To this end, provision is made for ancillary devices which serve to disconnect the welding torch from its operating mechanisms. On the one hand, the locking-bolt 50 serves to separate the control rod 40 from the bushing 48 and to move said rod rearwardly into a position in which a bevel pinion 82 which is fitted on the extremity of the rod engages with a corresponding pinion 84 which is adapted to rotate within the tube 22 (as shown in FIG. 6). Said pinion can be oriented from the exterior by means of a handle which has not been shown in the drawings. The movement of rotation of the rod actuates by means of any suitable mechanism which has not been illustrated the centering members which are provided on the outer tube 20. Said centering members consist, for example, of three radial push-rods terminating in balls which are applied against the sleeve 10, said push-rods being associated with the tube wall by means of a coarse-pitch helical bearing. Accordingly, the movement of rotation imparted thereto by a threaded nut which is keyed on the control rod causes said centering members either to project and bear against the sleeve or to retract depending on the direction of rotation.

The adjustment of the longitudinal position of the welding torch can be performed in a semi-automatic manner by a number of methods. It is possible in particular to move forward the entire assembly B by means of the rack and pinion mechanism. The assembly B is accordingly provided with a rod which is bent back radially so as to come into abutment with the lips 14–16. It is merely necessary to make provision for a rod which is parallel to the axis, made integral with the head and fitted with a feed-control hand lever 86 (as shown in FIG. 7) which can be secured in a withdrawn position (the welding torch being locked during this operation) and released from this withdrawn position so as to permit a spring (not shown in the figures) to bring the bent-back rod into abutment with the lips.

FIGS. 3b also shows, looking from the exterior, the mechanism for driving the assembly B in rotation; this mechanism comprises a reduction gear motor 88 which is adapted to drive a ring-gear (not shown) which is made fast for rotation with the assembly B through the intermediary of a clutch unit controlled by means of a hand lever 90 and a pinion. FIG. 3b also shows the reel 92 which is intended to accommodaate the wire of filler metal, the feed motor 94 being designed to actuate the reel 92 as well as the drum 98 onto which are wound the supply cables 100 during the rotation of the assembly B in the direction indicated by the arrow f.

The processes of positioning and operation of the apparatus will now have become apparent from the above description and will therefore be described only briefly. After various preliminary checks have been made, the apparatus (welding torch folded back and withdrawn, centering members retracted) is inserted in the sleeve 10 and the casing is fixed to this latter by means of the screws 30.

The control handle for the centering members is operated so as to cause these latter to come into their projecting position, whereupon the hand lever 86 is freed so as to effect the axial adjustment of the welding torch. Finally, the control rod 40 is coupled to its bushing 48 by actuating the hand lever 52. Once these operations have been carried out and the cycle of the eccentric 42' has been set (as a rule so that the minimum radius should correspond to the lowest point of the weld) and when the position of the welding torch has been checked by means of the optical system, the different control motors are simultaneously started up until the assembly B has performed one full revolution.

Once the weld has been effected and subsequently inspected by means of the optical system, the centering members can be disengaged with a view to withdrawing the apparatus only when the welding torch has been completely retracted radially. By virtue of this arrangement, the welding torch cannot be damaged as a result of an oversight.

It will be apparent that the scope of this invention is not limited solely to the particular form of embodiment which has been described by way of example and it must accordingly be understood that the scope of this patent extends to all alternative forms which remain within the definition of equivalent means.

What we claim is:

1. Welding apparatus, comprising: a support member; means for centering said support member in the axis of a non-horizontal, circular zone to be welded; means for causing said support member to rotate about said axis; an arc welding unit pivotally mounted on a pin located transversely with respect to the aforesaid axis and carried by the support member; means connected with said welding unit and responsive to rotation of said support member for imparting to the tip of said welding unit a slow, radial oscillatory movement about said pin and across said circular zone having a period equal to the time required for one complete revolution of the support member, and a mechanism mounted on said support member and operably connected with said welding unit for imparting to the tip of said welding unit, a rapid, radial oscillatory welding movement about said pin and across said circular zone.

2. Apparatus in accordance with claim 1, wherein said mechanism comprises an axial kinematic chain, the length of which determines the angle of inclination of said welding unit on said pin.

3. Apparatus in accordance with claim 2, wherein said kinematic chain comprises a section having a length which is a function of the angular orientation of an eccentric in said chain controlled by a motor connected with said eccentric member and which imparts to said eccentric a speed of rotation which is considerably higher than the speed of rotation of said support member.

4. Apparatus in accordance with claim 2, wherein said kinematic chain comprises a section having a length which is a function of the angular orientation of an eccentric rotatably connected in said chain.

5. Apparatus in accordance with claim 2, wherein said kinematic chain comprises: a first eccentric rotatably mounted on a plate which is slidably mounted on said support member and driven by a motor carried by said plate, means connecting the eccentric arm of said first eccentric with said welding unit for imparting said oscillations thereto, a second eccentric rotatably mounted on said plate, and means connecting the eccentric arm of said second eccentric to the support, said means responsive to rotation of said support member being operably connected with said second eccentric for imparting rotation thereto and for imparting sliding movement to said plate during rotation of said support member.

6. An arc welding process for welding along a circular zone having an axis which is inclined to the vertical, comprising: rotatably supporting an arc welding unit on an axis coaxial with the axis of said circular zone and with the welding tip thereof in close proximity opposite to said zone; initiating welding at said circular zone and concurrently rotating said welding unit on its axis through at least one complete revolution while simultaneously imparting a slow radial oscillation to said welding tip so that it subscribes a mean welding circle having a radius substantially equal to the mean radius of said circular zone and with the axis of said mean welding circle displaced a short distance vertically upwardly off-center with respect to the axis of said circular zone and at the same time imparting a rapid radial welding oscillation to said welding tip back and forth across said circular zone.

7. Process in accordance with claim 6 wherein one complete slow radial oscillation is imparted to said welding tip during each complete rotation of said welding unit.

References Cited

UNITED STATES PATENTS

| 1,728,972 | 9/1929 | Krebs | 219—125 |
| 3,035,156 | 5/1962 | Staley | 219—125 |
| 3,084,243 | 4/1963 | Gotch | 219—125 |
| 3,142,745 | 7/1964 | Gotch | 219—125 |
| 3,207,408 | 9/1965 | Thome et al. | 219—125 |

RICHARD M. WOOD, *Primary Examiner.*

W. D. BROOKS, *Assistant Examiner.*

U.S. Cl. X.R.

219—61, 208, 316, 523; 337—381